US007934316B2

(12) United States Patent
Kagawa et al.

(10) Patent No.: US 7,934,316 B2
(45) Date of Patent: May 3, 2011

(54) CHARGING ROLLER, PROCESS CARTRIDGE AND IMAGE FORMING APPARATUS

(75) Inventors: Toshiaki Kagawa, Kitakatsuragi-gun (JP); Kouji Shinkawa, Kitakatsuragi-gun (JP); Tohru Sakuwa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/585,130

(22) Filed: Sep. 4, 2009

(65) Prior Publication Data

US 2010/0003413 A1 Jan. 7, 2010

Related U.S. Application Data

(62) Division of application No. 11/785,651, filed on Apr. 19, 2007, now abandoned.

(30) Foreign Application Priority Data

Apr. 28, 2006 (JP) ................................ 2006-127060
Mar. 19, 2007 (JP) ................................ 2007-071578

(51) Int. Cl.
*B21K 1/02* (2006.01)
*F16C 13/00* (2006.01)

(52) U.S. Cl. ............. 29/895.3; 29/895; 492/56; 492/53; 492/59

(58) Field of Classification Search ................. 29/895.3, 29/895.32, 895; 492/56, 53, 59
See application file for complete search history.

(56) References Cited

U.S. PATENT DOCUMENTS 5,235,386 A 8/1993 Yano et al.
6,438,331 B2 * 8/2002 Sakaizawa et al. ............. 399/50
6,534,180 B2 * 3/2003 Hoshi ........................... 428/413
7,218,879 B2 5/2007 Enoki et al.
2001/0026694 A1 * 10/2001 Sakaizawa et al. ............. 399/50
2001/0055687 A1 12/2001 Hoshi
2003/0118372 A1 6/2003 Kitano et al.
2006/0210311 A1 9/2006 Kakui et al.
2006/0285897 A1 12/2006 Sugiura et al.
2007/0253738 A1 * 11/2007 Sakuwa et al. ................ 399/176
2008/0205941 A1 8/2008 Sakai

FOREIGN PATENT DOCUMENTS

JP 5-281830 10/1993
JP 09146345 A * 6/1997
JP 2000-346051 12/2000
JP 2001-099137 4/2001
JP 2001-166634 6/2001
JP 2001-348443 12/2001
JP 2002-082514 3/2002

(Continued)

*Primary Examiner* — Essama Omgba
(74) *Attorney, Agent, or Firm* — Nixon & Vanderhye, P.C.

(57) ABSTRACT

An object of the present invention is to provide a charging roller (i) which includes a rubber member whose surface is subjected to a hardening treatment using a solvent containing at least an isocyanate compound and (ii) which can prevent leakage of an ionic conductive agent even if the charging roller is placed under conditions of high temperature and high humidity for a long time. The charging roller is made by forming a rubber layer on a metal core. The rubber layer is an epichlorohydrin based rubber base material to which an ionic conductive agent is added, the rubber layer being subjected to a surface treatment by applying a solution containing the isocyanate compound and heating it. This surface treatment is carried out under such conditions that a coefficient of dynamic friction at a contact portion between the rubber layer and a photoreceptor becomes 0.4 or less.

3 Claims, 6 Drawing Sheets

FOREIGN PATENT DOCUMENTS

| | | | | |
|---|---|---|---|---|
| JP | 3444391 | | | 6/2003 |
| JP | 2004-191960 | | | 7/2004 |
| JP | 2004-191961 | | | 7/2004 |
| JP | 2004-277179 | | | 10/2004 |
| JP | 2004-341327 | | | 12/2004 |
| JP | 2005-107365 | | | 4/2005 |
| JP | 2005107365 | A | * | 4/2005 |
| JP | 2005-165213 | | | 6/2005 |
| JP | 2005-338167 | | | 12/2005 |
| JP | 2005345988 | A | * | 12/2005 |
| JP | 2006-53544 | | | 2/2006 |

* cited by examiner

GRAPH FOR OBTAINING YOUNG's MODULUS FROM RUBBER HARDNESS

GRAPH FOR OBTAINING CORRECTION COEFFICIENT OF NIP WIDTH h0 FROM THICKNESS b

CHARGING ROLLER, PROCESS CARTRIDGE AND IMAGE FORMING APPARATUS

This application is a divisional of application Ser. No. 11/785,651, filed Apr. 19, 2007 and now abandoned; which is a national stage of Japanese Application Nos. 127060/2006, filed Apr. 28, 2006 and 071578/2007, filed Mar. 19, 2007. The entire contents of each of the above referenced patent application are hereby incorporated herewith by reference.

FIELD OF THE INVENTION

The present invention relates to a charging roller which contacts an image carrier, on which an electrostatic latent image is formed, and charges the image carrier, in an electrophotographic image forming apparatus.

BACKGROUND OF THE INVENTION

In electrophotographic image formation, an electrostatic latent image corresponding to an image is formed on the surface of a photoreceptor. Before forming the electrostatic latent image on the photoreceptor, it is necessary to carry out a charging processing of uniformly charging the surface of the photoreceptor. There are two kinds of methods for charging the photoreceptor, a non-contact charging method and a contact charging method.

In the non-contact charging method, a so-called corotron charger or scorotron charger is used. By corona discharge caused by the charger, electric charge is supplied over the air to the photoreceptor. This non-contact charging method is advantageous in that since the charger does not contact the photoreceptor, it is possible to reduce the contamination and abrasion of the photoreceptor. In contrast, the non-contact charging method is disadvantageous in that a by-product, such as ozone, is generated due to the corona discharge.

In recent years, in light of environmental consideration, there has been increasing interest in contact chargers which does not use the corona discharge. Among the contact chargers, there is a charger which causes a rubber member, to which a voltage is applied and which is in the shape of a roller, to contact the photoreceptor. A roller including the rubber member is generally called a charging roller.

Document 1 describes a charging roller whose surface's friction coefficient is set to 0.4 or more to prevent poor charging caused due to nonuniform contamination on the surface of the charging roller.

Moreover, Documents 2 to 9 describe a technique of carrying out a surface treatment with respect to the rubber member of the charging roller. According to the techniques described in Documents 2 to 9, by modifying (hardening) the surface of the rubber member, made of an epichlorohydrin based rubber base material, using an isocyanate compound, it is possible to prevent leakage of, for example, an ionic conductive agent from the surface of the rubber member without further forming a layer around the rubber member.

However, the charging roller having been subjected to the surface treatment described in Documents 2 to 9 has a problem in that the ionic conductive agent contained in the rubber member leaks out when the charging roller is placed under conditions of high temperature and high humidity for a long time. If the ionic conductive agent leaks out from the charging roller, the leaked-out ionic conductive agent contaminates the photoreceptor. As a result, when forming an electrostatic latent image on the surface of the photoreceptor by a light irradiation process carried out after the charging, the electric charge remains in a contaminated region, and a white patch and/or a low concentration region is formed within a formed image.

(Document 1)

Japanese Unexamined Patent Publication No. 268583/1992 (Tokukaihei 4-268583, published on Sep. 24, 1992)

(Document 2)

Japanese Unexamined Patent Publication No. 281830/1993 (Tokukaihei 5-281830, published on Oct. 29, 1993)

(Document 3)

Japanese Unexamined Patent Publication No. 2000-346051 (Tokukai 2000-346051, published on Dec. 12, 2000)

(Document 4)

Japanese Unexamined Patent Publication No. 2001-348443 (Tokukai 2001-348443, published on Dec. 18, 2001)

(Document 5)

Japanese Unexamined Patent Publication No. 2002-40760 (Tokukai 2002-40760, published on Feb. 6, 2002)

(Document 6)

Japanese Unexamined Patent Publication No. 2002-82514 (Tokukai 2002-82514, published on Mar. 22, 2002)

(Document 7)

Japanese Unexamined Patent Publication No. 2004-191960 (Tokukai 2004-191960, published on Jul. 8, 2004)

(Document 8)

Japanese Unexamined Patent Publication No. 2004-191961 (Tokukai 2004-191961, published on Jul. 8, 2004)

(Document 9)

Japanese Unexamined Patent Publication No. 2006-53544 (Tokukai 2006-53544, published on Feb. 23, 2006)

SUMMARY OF THE INVENTION

The present invention was made to solve the above problems, and an object of the present invention is to provide a charging roller (i) which includes a rubber member whose surface is subjected to a hardening treatment using a solvent containing at least an isocyanate compound, and (ii) which can prevent an ionic conductive agent from leaking out even if the charging roller is placed under conditions of high temperature and high humidity for a long time.

In order to solve the above problems, a charging roller of the present invention is made by forming a rubber layer, contacting an image carrier, on a conductive supporting body, and the rubber layer is a conductive agent-added rubber layer formed by adding at least an ionic conductive agent to a rubber base material to which a conductive agent is not added, a surface of the conductive agent-added rubber layer being subjected to a hardening treatment using a solvent containing at least an isocyanate compound so that a coefficient of dynamic friction at a contact portion between the conductive agent-added rubber layer and the image carrier is 0.4 or less.

Leakage of the ionic conductive agent from the charging roller occurs since the hardening treatment is not adequately carried out with respect to the conductive agent-added rubber layer. The degree of progress of the hardening treatment depends not only on a processing time but also on a processing temperature, the concentration of the solvent, etc. Moreover, optimum processing time and processing temperature change depending on the size (heat capacity) of the roller. Therefore, whether or not the hardening treatment is adequately carried out with respect to the conductive agent-added rubber layer cannot be determined depending only on the processing time.

As a result of diligent studies, the present inventor has found that the degree of progress of the hardening treatment with respect to the conductive agent-added rubber layer is closely related to the coefficient of dynamic friction at the contact portion between the rubber layer (conductive agent-added rubber layer) and the image carrier. Thus, the present invention has been completed.

If the hardening treatment is not carried out adequately, the surface of the conductive agent-added rubber layer is not hardened adequately. Therefore, the coefficient of dynamic friction at the contact portion increases. Moreover, from a microscopical viewpoint, if the hardening treatment is not carried out adequately, there exist many regions where the rubber layer having a high coefficient of dynamic friction is exposed. Therefore, the coefficient of dynamic friction at the contact portion increases. On this account, it is possible to find out the degree of progress of the hardening treatment with respect to the conductive agent-added rubber layer on the basis of the coefficient of dynamic friction at the contact portion.

According to the structure of the present invention, the hardening treatment with respect to the conductive agent-added rubber layer is carried out until the coefficient of dynamic friction at the contact portion becomes 0.4 or less. Therefore, as described in Examples below, the conductive agent-added rubber layer is hardened adequately. As a result, even if the charging roller is placed under conditions of high temperature and high humidity for a long time, it is possible to prevent the ionic conductive agent from leaking out from the rubber layer.

Moreover, a process cartridge of the present invention includes the image carrier and the charging roller. Moreover, an image forming apparatus of the present invention also includes the image carrier and the charging roller.

Additional objects, features, and strengths of the present invention will be made clear by the description below. Further, the advantages of the present invention will be evident from the following explanation in reference to the drawings.

DESCRIPTION OF THE EMBODIMENTS

Embodiment

The following will explain one embodiment of the present invention in reference to FIGS. 1 to 7.

Figure 2:
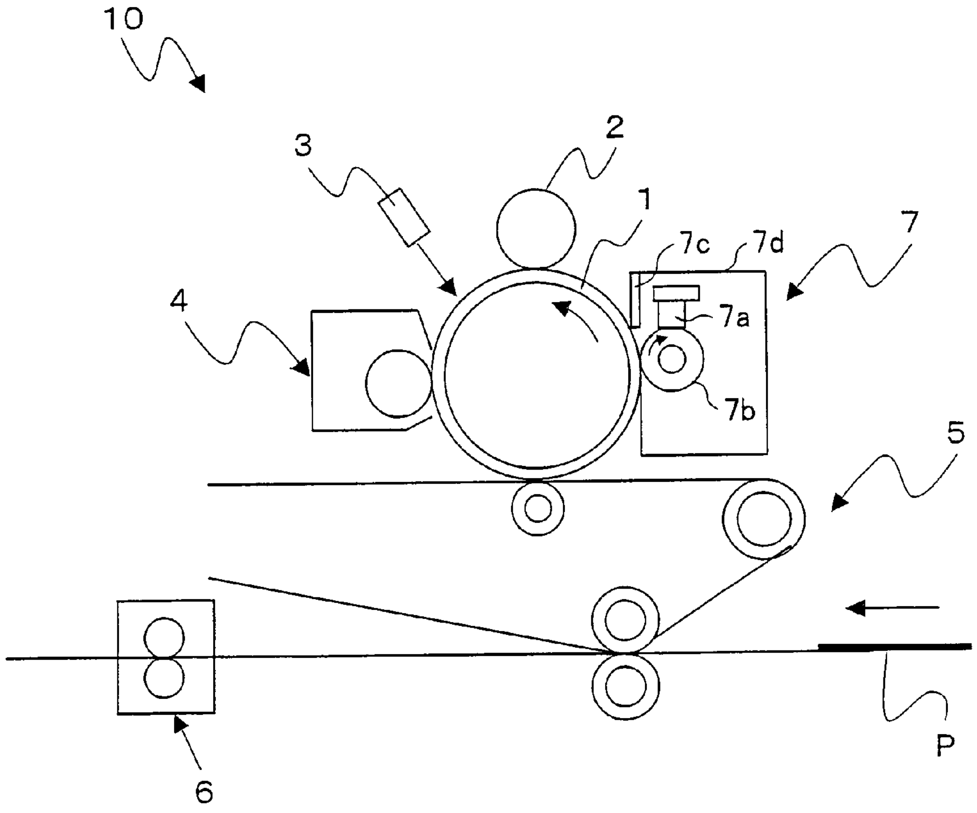
FIG. 2 shows one embodiment of the present invention, and is a cross-sectional diagram showing the entire structure of an image forming apparatus.

Referring to FIG. 2, the structure of major features of an image forming apparatus 10 of the present embodiment will be described. FIG. 2 is a vertical cross-sectional view of the image forming apparatus 10 when viewed from the front.

As shown in FIG. 2, the image forming apparatus 10 forms an image represented by image data on a sheet of paper by an electrophotographic scheme. The image forming apparatus 10 contains a photoreceptor (image carrier) 1. Around the photoreceptor 1 are there provided components which perform a well-known Carlson process: namely, a charging roller 2, illumination unit 3, developing unit 4, transfer unit 5, fusing unit 6, and cleaning unit 7.

The photoreceptor 1 is shaped like a drum and supported at its axis by a housing (not shown) in such a way that it is rotatable. The photoreceptor 1 contains a supporting body having a photosensitive layer being formed on its surface. The supporting body is made of, for example, an aluminum-based material. The layer is made of, for example, an OPC (organic photoconductor). The drum-shaped photoreceptor 1 may be replaced with a belt-shaped photoreceptor.

The charging roller 2 contacts the surface of the photoreceptor 1 to uniformly charge the surface of the photoreceptor 1 to a desired electric potential. The roller 2 is shaped like a roller. The charging roller 2 is supported at its axis by a housing (not shown) in such a way that it is rotatable. The structure of the charging roller 2 will be described later in detail.

The illumination unit 3 may be an ELD (electroluminescent display), LED (light emitting diode), or like write head in which light emitting elements are arranged in an array. Alternatively, the unit 3 may be a laser scanning unit (LSU) which is equipped with a laser emitting device and a reflection mirror. The illumination unit 3 illuminates the photoreceptor 1 in accordance with the externally supplied image data to form an electrostatic latent image in accordance with the image data on the photoreceptor 1.

The developing unit 4 visualizes (develops) the electrostatic latent image formed on the surface of the photoreceptor 1 with toner, thereby forming a toner image. The transfer unit 5 includes a rotating endless belt supported by a plurality of rollers. In the transfer unit 5, the toner image is transferred first from the photoreceptor 1 to the endless belt and then from the endless belt to paper. A toner image is thus formed on the paper.

The fusing unit 6 presses the paper onto which the toner image has been transferred with heated rollers from both sides of the paper, to fuse the toner image onto the paper.

The cleaning unit 7 cleans the surface of the photoreceptor 1 after the toner image transfer. The cleaning unit 7 contains a lubricant 7*a*, a brush roller 7*b*, and a blade 7*c*, all of which are housed in an enclosure 7*d*.

The blade 7*c* collects the remaining toner on the surface of the photoreceptor 1. The blade 7*c* is made of an elongated rubber member and positioned so that its length is parallel to the axis of the photoreceptor 1. The blade 7*c* is placed so that one of the long sides is located downstream of an opening provided on the enclosure 7*d* in terms of the rotation of the photoreceptor 1 and that the edge of the other long side is in contact with the surface of the photoreceptor 1.

The lubricant 7*a* is applied to the surface of the photoreceptor 1 by the brush roller 7*b*. The lubricant 7*a* is a solid type and has a rectangular parallelepiped shape. The lubricant 7*a* has the same length (width) as the photoreceptor 1 and is positioned so that its length is parallel to the axis of the photoreceptor 1. The lubricant 7*a* is supported by a lubricant holder. The lubricant 7*a* is replaceable if it wears down.

The lubricant 7*a* may be, for example, a metal salt of a fatty acid, known as metal soap, or fluorine resin. Examples of metal salts of fatty acids include zinc stearate, copper stearate, iron stearate, magnesium palmitate, zinc oleate, calcium palmitate, manganese oleate, lead oleate, and other like metal salts of fatty acids with a relatively long chain.

The brush roller 7*b* is tubular and has almost the same length (width) as the photoreceptor 1. The roller 7*b* is positioned with its axis parallel to that of the photoreceptor 1 so that the tips of the brush hair touch the surface of the photoreceptor 1. The brush roller 7*b* is driven to rotate in the opposite direction to the photoreceptor 1. Thus, the roller 7*b* and the photoreceptor 1 slide against each other in the same orientation where they are in contact.

The contact portion between the brush roller 7*b* and the photoreceptor 1 occurs downstream of the transfer site in terms of the rotation of the photoreceptor 1. The brush roller 7*b* therefore contacts the surface of the photoreceptor 1 to which the toner image has been already transferred. The brush roller 7*b* scrapes the lubricant 7*a* located upstream of its contact portion with the photoreceptor 1 in terms of the rotation of the brush roller 7*b*, and applies the scraped lubricant to the surface of the photoreceptor 1.

As above, the brush roller 7*b* applies the fine particles in the lubricant 7*a* to the surface of the photoreceptor 1. Thus, the friction between the blade 7*c* and the surface of the photoreceptor 1 decreases. In addition, the adhesion of the toner to the surface of the photoreceptor 1 becomes weak. As a result, the blade 7*c* efficiently removes the toner, and the abrasion of the photoreceptor 1 is suppressed.

In the image forming apparatus of the present embodiment, the photoreceptor 1 and the charging roller 2 may be provided detachably. That is, the above image forming apparatus may be realized by integrally forming at least the photoreceptor 1 and the charging roller 2 as a process cartridge (process apparatus) and attaching this process cartridge to the image forming apparatus.

Figure 3:
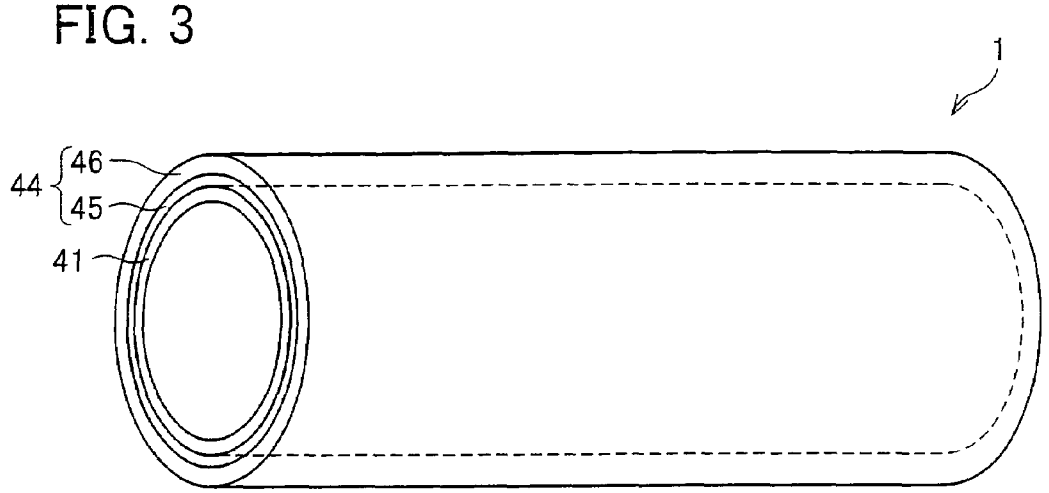
FIG. 3 shows one embodiment of the present invention, and is a perspective view showing the structure of a photoreceptor.

The following will explain the structure of the photoreceptor 1 in detail. In the present embodiment, as shown in FIG. 3, the photoreceptor 1 is in the shape of a drum and includes a supporting body 41 and a photosensitive layer 44 formed on the surface of the supporting body 41.

The supporting body 41 supports the photosensitive layer 44. The supporting body 41 may be (a) a metal material, such as aluminum, an aluminum alloy, copper, zinc, stainless steel, or titanium, (b) a polymer material, such as polyethylene terephthalate, polyester, polyoxymethylene, or polystyrene, hard paper, or glass which have its surface laminated with metal foil, which have a metal material vapor-deposited on the surface, or which have a layer of a conductive compound, such as an electrically conductive polymer, tin oxide, indium oxide, carbon particles, or metal particles, vapor-deposited or applied to the surface.

Figure 4:
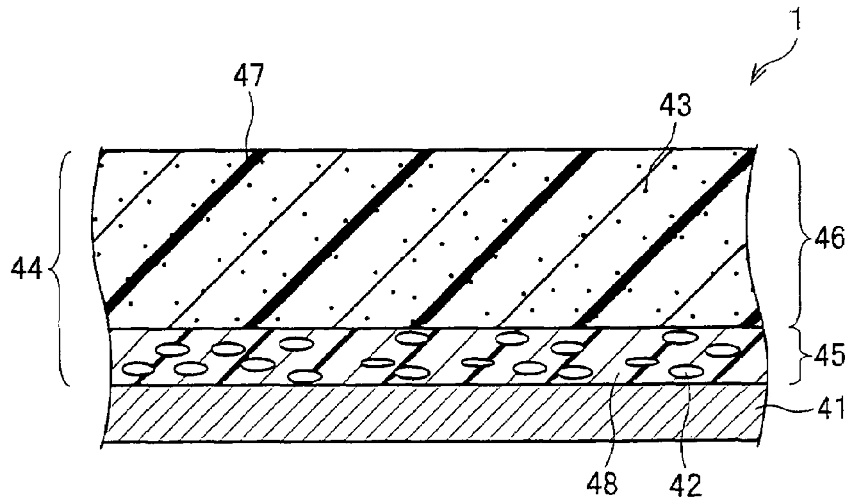
FIG. 4 shows one embodiment of the present invention, and is a cross-sectional diagram showing the internal structure of the photoreceptor.

The photosensitive layer 44 is made of, for example, an OPC (organic photoconductor). As shown in FIG. 3, the photosensitive layer 44 includes an electric charge generating layer 45 and an electric charge transporting layer 46 in this order from the surface of the supporting body 41. The electric charge generating layer 45 generates electric charge by receiving light irradiation. As shown in FIG. 4, the electric charge generating layer 45 includes (i) an electric charge generating material (CGM) 42 which generates the electric charge by absorbing the light and (ii) a binder resin 48 which binds the electric charge generating material 42.

The electric charge transporting layer 46 receives the electric charge generated by the electric charge generating layer 45, and transports the electric charge to the surface of the photoreceptor 1. As shown in FIG. 4, the electric charge transporting layer 46 includes (i) an electric charge transporting material (CTM) 43 which transports the electric charge, and (ii) a binder resin 47 which binds the electric charge transporting material 43.

When the photosensitive layer 44 is exposed to light by the light irradiation, the exposed region of the electric charge generating layer 45 generates the electric charge, and the electric charge transporting layer 46 transports the generated electric charge to the surface of the photosensitive layer 44. As a result, the electric charge on the surface of the photosensitive layer 44 is neutralized. Thus, the electrostatic latent image is formed.

The electric charge generating material 42 is desirably such a material that generates the electric charge by light having a wavelength of 400 nm to 800 nm. Specific examples are (i) azo compounds, such as bisazo compounds and trisazo compounds, (ii) phthalocyanine compounds, (iii) squarylium compounds, (iv) azulenium compounds (v) perylene based compounds, (vi) indigo compounds, (vii) quinacridone compounds, (viii) polycyclic quinone compounds, (ix) cyanine pigments, (x) xanthene dyes, and (xi) charge moving complexes, such as poly-N-vinylcarbazole and trinitrofluorenone. These compounds may be used in any combination of two or more of them where necessary. Note that the ratio of the electric charge generating material 42 to the electric charge generating layer 45 is preferably 20% to 80% by weight.

Meanwhile, as the electric charge transporting material 43, it is possible to use, for example, a carbazole derivative, an oxazole derivative, an oxadiazole derivative, a thiazole derivative, a thiadiazole derivative, a triazole derivative, an imidazole derivative, an imidazolone derivative, an imidazolidine derivative, a bisimidazolidine derivative, a styryl compound, a hydrazone compound, a pyrazoline derivative, an oxazolone derivative, a benzimidazole derivative, a quinazoline derivative, a benzofuran derivative, an acridine derivative, a phenazine derivative, an aminostilbene derivative, a triallyl amine derivative, a phenylenediamine derivative, a stilbene derivative, a benzidine derivative, poly-N-vinylcarbazole, poly-1-vinylbilene, or poly-9-vinylanthracene. These compounds may be used in any combination of two or more of them where necessary. Note that the ratio of the electric charge transporting material 43 to the electric charge transporting layer 46 is preferably 20% to 80% by weight.

The binder resins 47 and 48 are, for example, only one resin selected from the group comprising (i) various resins, such as a polyester resin, a polystyrene resin, a polyurethane resin, a phenol resin, an alkyd resin, a melamine resin, an epoxy resin, a silicone resin, an acrylic resin, a methacrylic resin, a polycarbonate resin, a polyarylate resin, a phenoxy resin, a polyvinylbutyral resin, and a polyvinylformal resin, and (ii) copolymer resins containing two or more repeating units of these resins. Alternatively, the binder resins 47 and 48 may be two or more resins selected from that group which are used in mixture form. Moreover, the binder resins 47 and 48 may also be, for example, an insulating copolymer resin, such as a vinyl chloride-vinyl acetate copolymer resin, a vinyl chloride-vinyl acetate-maleic anhydride copolymer resin, or an acrylonitrile-styrene copolymer resin.

The photoreceptor 1 is manufactured as follows. The supporting body 41 is immersed in an electric charge generating layer liquid which contains the electric charge generating material 42, the binder resin 48, and an organic solvent for the materials so that the solution is applied to the supporting body 41. The organic solvent is evaporated to form the electric charge generating layer 45. Then, the supporting body 41 is immersed in an electric charge transporting layer liquid which contains the electric charge transporting material 43, the binder resin 47, and an organic solvent for the materials so that the solution is applied to the supporting body 41. The organic solvent is evaporated to form the electric charge transporting layer 46.

Figure 1:
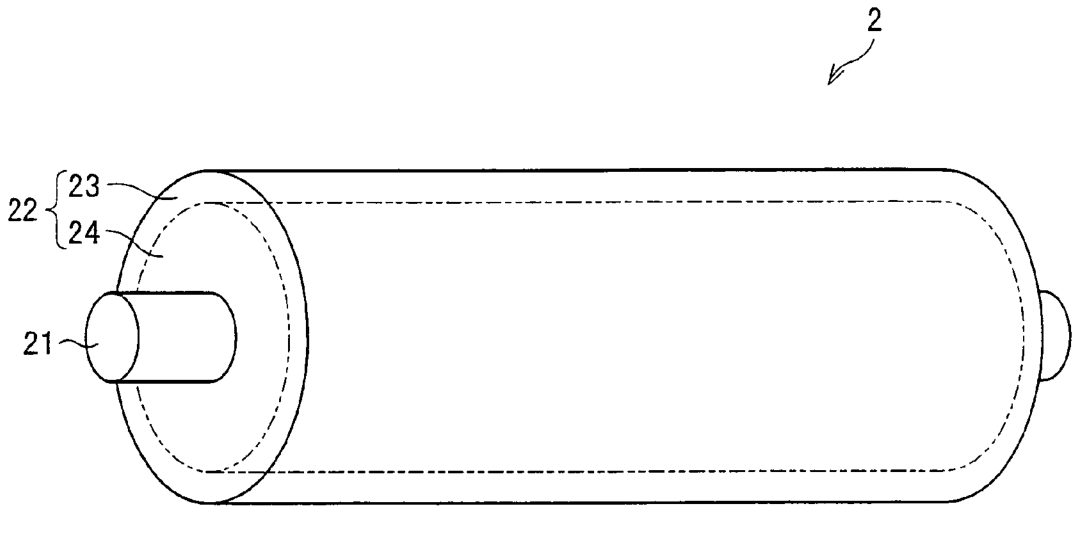
FIG. 1 shows one embodiment of the present invention, and is a perspective view showing the structure of a charging roller.

Next, the structure of the charging roller 2 will be described in detail. In the present embodiment, the charging roller 2 is shaped like a roller as shown in FIG. 1 and made of a columnar metal core 21 and a rubber layer 22 formed around the core 21. The rubber layer 22 contains a surface processed portion 23 and a non-surface processed portion 24. In the rubber layer 22, the processed portion 23 is located on the surface layer side, and the non-processed portion 24 is located on the metal core 21 side.

The metal core 21 is, for example, stainless steel (SUS) or another electrically conductive metal molded into a bar. A dc voltage is applied to the metal core 21 to charge the photoreceptor 1.

The rubber layer 22 around the metal core 21 is formed from a composition that includes as a base material an epichlorhydrin rubber of either any one or any blend of polymers selected from epichlorhydrin homopolymer, epichlorhydrin-ethylene oxide copolymer, epichlorhydrin-allyl glycidyl ether copolymer, and epichlorhydrin-ethylene oxide-allyl glycidyl ether terpolymer.

The rubber layer 22 of the present embodiment is the epichlorhydrin rubber base material to which an ionic conductive agent is added. With the addition of these conductive agents, the resistance of the rubber layer 22 can be adjusted to a desired value. The ionic conductive agent added to the rubber base material is, for example: an ammonia complex salt or a perchloride of a metal, such as Li, Na, K, Ca, or Mg; sodium acetate trifluoride; or a quaternary ammonium salt. Apart from the rubber base material and the various conductive agents, the rubber layer 22 may also contain an electronic conductive agent (such as carbon black), a vulcanization accelerator and a crosslinking agent.

The rubber base material containing the various additives is impregnated with a surface treatment liquid by applying the solution to that material. Then, the material is heated to form the processed portion 23 on the rubber layer 22. The surface treatment liquid may be applied by any general method, for example, by spraying or dipping. The inside portion of the rubber layer 22, not impregnated with the surface treatment liquid, is the non-processed portion 24. The processed portion 23 and the non-processed portion 24 have no distinct interface. The surface treatment prevents the ionic conductive agent, as an example, from leaking out from the rubber layer 22 and contaminating the photoreceptor.

As the surface treatment liquid, it is possible to use an isocyanate compound to which an acrylic fluorine-based polymer, an acrylic silicone-based polymer and a conductive agent (such as carbon black) are added. The isocyanate compound is, for example, 2,6-tolylenediisocyanate (TDI), 4,4'-diphenylmethanediisocyanate (MDI), paraphenylenediisocyanate (PPDI), 1,5-naphthalenediisocyanate (NDI), or 3,3-dimethyldiphenyl-4,4'-diisocyanate (TODI), as well as a multimer or denatured substance of these compounds.

The acrylic fluorine-based polymer and the acrylic silicone-based polymer can be any polymer that is soluble in a predetermined solvent and that forms chemical bonding with the isocyanate compound through reaction. Specifically, the acrylic fluorine-based polymer is a fluorine-based polymer which contains a hydroxyl group, an alkyl group, or a carboxyl group and is soluble in a solvent. Some of the examples are block copolymers of acrylic esters and acrylic alkyl fluoride and their derivatives. The acrylic silicone-based polymer is a silicone-based polymer that is soluble in a solvent. Some of the examples are block copolymers of acrylic esters and acrylic siloxane esters and their derivatives.

Regarding the charging roller 2, it should be noted that the surface treatment is carried out adequately with respect to the rubber layer 22. Leakage of the ionic conductive agent from the charging roller 2 under conditions of high temperature and high humidity occurs when the surface treatment is not carried out adequately with respect to the charging roller. Parameters which influence the degree of progress of the surface treatment with respect to the charging roller are, for example, the concentration of the surface treatment liquid, and a firing temperature and firing time of a firing treatment carried out after the application of the surface treatment liquid.

Regarding the charging roller 2 of the present embodiment, the degree of progress of the surface treatment which degree is influenced by the above parameters is determined on the basis of the coefficient of dynamic friction at the contact portion (nip portion) between the surface of the rubber layer 22 of the charging roller 2 and the surface of the photoreceptor 1. With respect to the charging roller 2 of the present embodiment, the surface treatment is carried out under such conditions that the coefficient of dynamic friction at the contact portion between the surface of the rubber layer 22 and the surface of the photoreceptor 1 becomes 0.40 or less. In other words, the surface treatment is carried out with respect to the charging roller 2 of the present embodiment until the coefficient of dynamic friction at the contact portion between the surface of the rubber layer 22 and the surface of the photoreceptor 1 becomes 0.40 or less.

As described in Examples below, the degree of progress of the surface treatment is influenced by the above-described various parameters. However, if the surface treatment is carried out until the coefficient of dynamic friction becomes 0.40 or less, this means that the surface treatment is carried out adequately. Therefore, the ionic conductive agent does not leak out from the rubber layer 22 even if the charging roller 22 is placed under conditions of high temperature and high humidity for a long time.

Moreover, in order to prevent the ionic conductive agent from leaking out, it is also important not to increase too much a surface pressure of the contact portion between the charging roller 2 and the photoreceptor 1. Specifically, as described in Examples below, it is preferable that the surface pressure of the contact portion be 3.5 $g/mm^2$ or less. With this, it is possible to surely prevent the ionic conductive agent from leaking out when the charging roller 22 is placed under conditions of high temperature and high humidity for a long time.

The surface pressure of the contact portion between the charging roller 2 and the photoreceptor 1 cannot be measured directly. However, it can be calculated by the following method. In the present specification, "the surface pressure" means a value calculated by the following method. In the following formulas, "^" denotes a power, and "exp(A)" denotes e (base of natural logarithm) raised to the Ath power.

Figure 5:
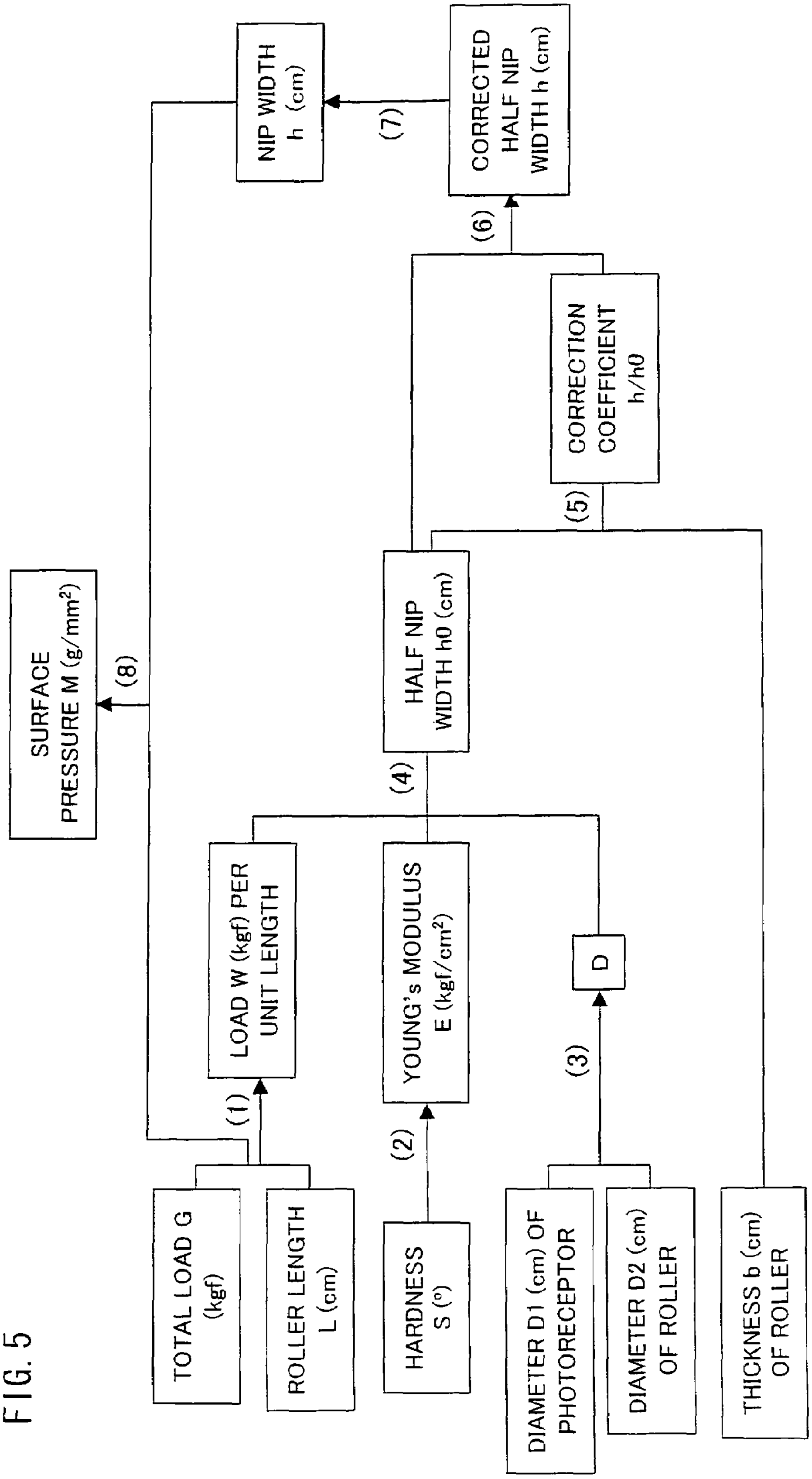
FIG. 5 is a flow chart showing a procedure of calculating a surface pressure.
Figure 6:
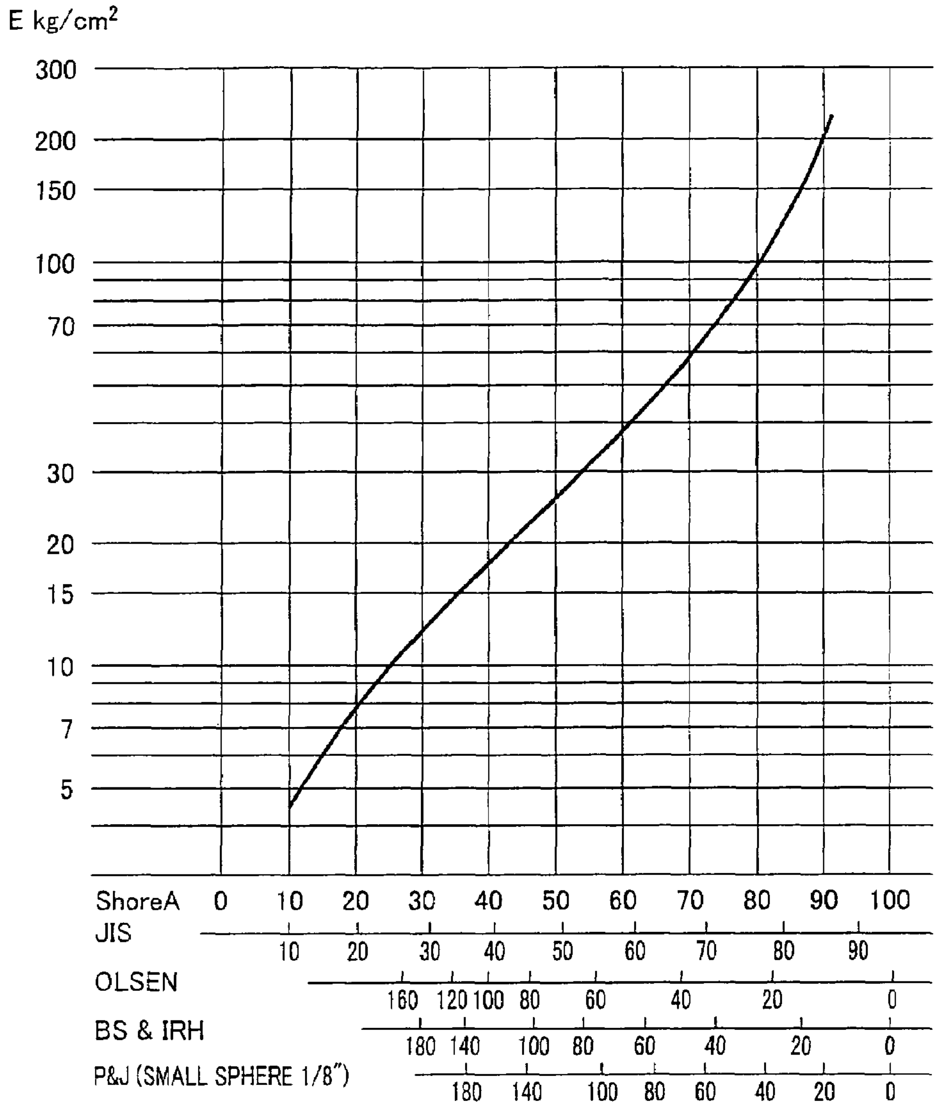
FIG. 6 is a diagram showing a relation between hardness and Young's modulus.
Figure 7:
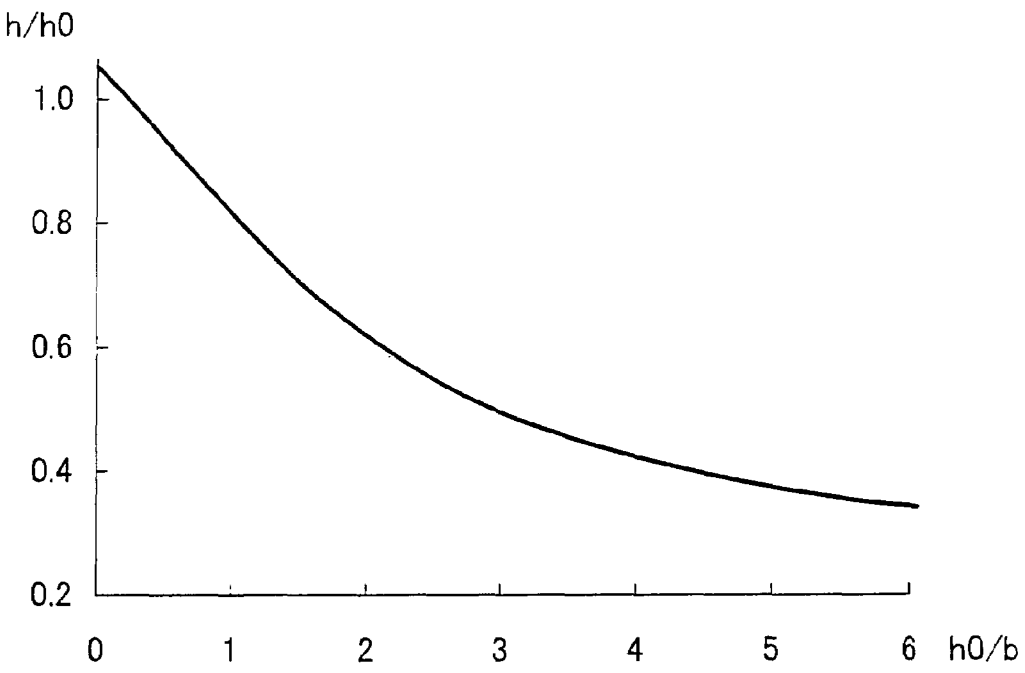
FIG. 7 is a diagram showing a relation between a thickness and a correction coefficient of a nip width.

FIG. 5 is a diagram showing a procedure of obtaining the surface pressure. First, a load W per unit length is calculated by Formula (1) below using a total load G (kgf) applied from the charging roller 2 to the photoreceptor 1 and a roller length L (cm) of a shorter one of the charging roller 2 and the photoreceptor 3.

$$W=G/L \quad (1)$$

Next, Young's modulus E is obtained using a hardness S of the surface of the rubber layer 22 of the charging roller 2. Generally, the relation between the hardness S shown by a gent formula and Young's modulus E can be shown by a graph of FIG. 6. The present application uses the JIS-A hardness as an index of the hardness. Then, Young's modulus E ($kg/cm^2$) is calculated by Approximation Formula (2) below using the JIS-A hardness S (degrees).

$$E=2.8764\times\exp(0.0458\times S) \quad (2)$$

Next, the value of a parameter D is calculated by Formula (3) below using a diameter D1 (cm) of the photoreceptor 1 and a diameter D2 (cm) of the charging roller 2.

$$1/D=1/D1+1/D2 \quad (3)$$

Next, a half nip width h0 is calculated by Formula (4) below using the load W per unit length, the parameter D and Young's modulus E.

$$h0=\{1.5\times(W\times D)/(\pi\times E)\}\hat{}0.5 \quad (4)$$

Next, a correction coefficient h/h0 for correcting the half nip width h0 is obtained using a thickness b (cm) of the rubber layer 22 of the charging roller 2. Generally, the relation between h/h0 and h0/b can be shown by a graph of FIG. 7. In the present application, h/h0 is calculated by Approximation Formula (5) below.

$$h/h0=-0.002\times(h0/b)\hat{}3+0.0402\times(h0/b)\hat{}2-0.289\times(h0/b)+1.0586 \quad (5)$$

Then, the corrected half nip width h is calculated by Formula (6) below using the obtained correction coefficient h/h0.

$$h=(h/h0)\times h0 \quad (6)$$

Next, a nip width h' is calculated by Formula (7) below using the corrected half nip width h.

$$h'=2\times h \quad (7)$$

Finally, the surface pressure M ($g/cm^2$) is calculated by Formula (8) below using the total load G, the roller length L and the nip width h'.

$$M=1{,}000\times G/(L\times h') \quad (8)$$

As above, the surface pressure M ($g/cm^2$) can be obtained by Formulas (1) to (8) using the total load G (kgf), the roller length L (cm), the hardness S (degrees) of the surface of the rubber layer 22 of the charging roller 2, the diameter D1 (cm) of the photoreceptor 1, the diameter D2 (cm) of the charging roller 2 and the thickness b (cm) of the rubber layer 22 of the charging roller 2.

As described above, the cleaning unit 7 of the image forming apparatus 10 of the present embodiment includes the brush roller 7*b*. Since the peripheral surface of the brush roller 7*b* contacts the lubricant 7*a* and the photoreceptor 1, the brush roller 7*b* can apply the lubricant 7*a* to the photoreceptor 1. In addition to the function of applying the lubricant 7*a* to the photoreceptor 1, the brush roller 7*b* has a function of removing, for example, the ionic conductive agent leaked out from the rubber layer 22 of the charging roller 2 and adhered to the photoreceptor 1.

As above, the charging roller 2 of the present embodiment is manufactured by forming the rubber layer 22 on the metal core 21 (conductive supporting body). The charging roller 2 can be manufactured by a method including the steps of (i) forming a rubber base material, to which at least an ionic conductive agent is added, on the metal core 21 (conductive supporting body) as a conductive agent-containing rubber layer (rubber layer forming step) and (ii) carrying out a hardening treatment with respect to the surface of the conductive agent-containing rubber layer, formed in the rubber layer forming step, using a solvent containing at least an isocyanate compound (hardening treatment step). It should be noted that the hardening treatment is carried out under such conditions that the coefficient of dynamic friction at the contact portion between the surface of the rubber layer 22 and the surface of the photoreceptor 1 (image carrier) becomes 0.40 or less.

EXAMPLES

The following will explain Examples carried out for testing the effectiveness of the present invention.

(Experiment 1)

The present experiment was carried out to examine whether or not the photoreceptor 1 is contaminated by the leakage of the ionic conductive agent from the rubber layer 22 when the surface treatment is carried out under various conditions with respect to the rubber layer 22 containing the ionic conductive agent. Then, a relation between the contamination of the photoreceptor 1 and the coefficient of dynamic friction was revealed. Further, examined was a relation between (i) the coefficient of dynamic friction at the contact portion between the rubber layer 22 of the charging roller 2 and the photosensitive layer 44 of the photoreceptor 1 and (ii) slip of the charging roller 2.

First, the following will explain components that are common in Examples and Comparative Examples below. In the present experiment, used as the metal core 21 was a SUS rod having a diameter of 8 mm, and used as the rubber base material of the rubber layer 22 was epichlorohydrin rubber. Then, the rubber base material was kneaded with (i) the electronic conductive agent containing carbon black as a major component and (ii) the ionic conductive agent containing lithium perchlorate as a major component. Using this rubber base material, the rubber layer 22 containing the ionic conductive agent was formed on the metal core 21. Thus, a pseudo charging roller 12 was manufactured. Then, the surface of the rubber layer 22 of the pseudo charging roller 12 was polished, so that the external diameter of the rubber layer 22 became 21 mm.

Next, the pseudo charging roller 12 was impregnated, by spraying, with a surface treatment liquid containing an isocyanate compound, acrylic fluorine-based polymer and acrylic silicone-based polymer, and the firing treatment was carried out with respect to the pseudo charging roller 12. Thus, the surface treatment was carried out with respect to the pseudo charging roller 12. As a result, the charging roller 2 was manufactured. In each of Examples and Comparative Examples below, one of three different levels of the firing temperature of the firing treatment, one of three different levels of the firing time of the firing treatment, and one of three different levels of the concentration of the surface treatment liquid are selected and combined accordingly.

Used as the supporting body 41 of the photoreceptor 1 was an aluminium tube having a surface roughness (maximum height of JIS B 0601-1982) Rmax of 3 μm and a diameter of 80 mm. Prepared as the electric charge generating layer liquid that was a material of the electric charge generating layer 45 of the photoreceptor 1 was a liquid containing the following.

Y type oxo-titanyl phthalocyanine (produced by SYNTEC, Electric charge generating material) . . . 1 part by weight Polyvinylbutyral (produced by Sekisui Chemical Co., Ltd., Product Name: S-LEC BMS, Binder resin) . . . 1 part by weight Methyl ethyl ketone (Organic solvent) . . . 98 parts by weight Moreover, prepared as the electric charge transporting layer liquid that was a material of the electric charge transporting layer 46 was a liquid containing the following.

Styryl based compound (Electric charge transporting material) shown by the following structural formula . . . 100 parts by weight (Chemical Formula 1)

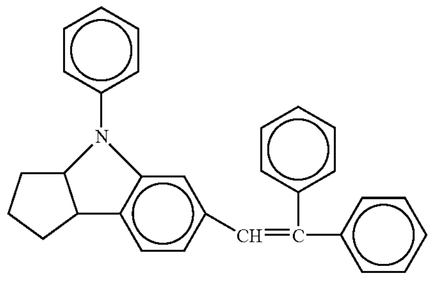

Polycarbonate resin (produced by Teijin Chemicals, Ltd., Product Name: C1400, Viscosity average molecular weight: 38,000, Binder resin) . . . 100 parts by weight Methyl ethyl ketone (Organic solvent) . . . 800 parts by weight Silicone oil (produced by Toray Dow Corning Silicone Co., Ltd., Product Name: SH200, Additive) . . . 0.02 parts by weight Then, the supporting body 41 was soaked in the respective layer liquids for applying the liquids thereto, and the organic solvent was evaporated. Thus, the photosensitive layer 44 was formed.

Then, the charging roller 2 and photoreceptor 1 manufactured as above was caused to contact each other so that the surface pressure of the contact portion was 3.5 g/mm$^2$. Then, they were placed under conditions of room temperature of 35° C. and 80% RH, that is, under conditions of high temperature and high humidity for 14 days. After that, to determine whether or not the surface of the photoreceptor 1 was contaminated by the ionic conductive agent, the photoreceptor 1 was incorporated into a digital multifunction device AR-705S produced by Sharp Corporation, the digital multifunction device AR-705S outputted, as print samples, three A3-size sheets on each of which a halftone image was formed entirely, and whether or not each sample had image defects (white patch or low-concentration region) due to the contamination of the photoreceptor was confirmed. Note that two different conditions were used when placing the photoreceptor 1 as above: one was that a lubricant containing zinc stearate was applied to the photoreceptor 1 in advance and then the photoreceptor 1 was caused to contact the charging roller 2; and another was that the lubricant was not applied to the photoreceptor 1, and the photoreceptor was caused to contact the charging roller 2.

The coefficient of dynamic friction between (i) the charging roller 2 which had been subjected to the surface treatment and will be left as they are and (ii) the photoreceptor 1 was measured by using a model produced as below. First, prepared was a sheet material which was made by applying the same photosensitive layer as that of the photoreceptor 1 to a PET film sheet and had a width of 10 mm. The sheet material was placed so that its photosensitive layer contacted the surface of the charging roller 2 which had been subjected to the surface treatment. Then, a 100 g weight was used to apply load to the sheet material, so that the photosensitive layer of the sheet material press-contacts the charging roller 2. In this state, the sheet material was pulled, and the coefficient of dynamic friction was measured using a friction coefficient measuring device (Product Name: Heidon-14) produced by Heidon. The value of the coefficient of dynamic friction measured using this model was regarded as the coefficient of dynamic friction between the charging roller 2 and the photoreceptor 1. Note that in the above measurement, the lubricant was not applied to the surface of the photosensitive layer.

Next, to examine the image defect caused due to the contamination of the photoreceptor, the charging roller 2 which was left as it is while contacting the photoreceptor 1 was incorporated into a contact-charging type device that is a modified device obtained by modifying the digital multifunction device AR-705S produced by Sharp Corporation, this modified device outputted, as print samples, three A3-size sheets on each of which a halftone image was formed entirely, and whether or not each sample had the image defect due to the slip of the charging roller was confirmed. Note that the photoreceptor used in the modified device was manufactured by the above-described method.

Example 1-1

The firing temperature of the firing treatment was set to "high" among three levels that are "high", "standard" and "low". The firing time of the firing treatment was set to "long" among three levels that are "long", "standard" and "short". The concentration of the surface treatment liquid was set to "high" among three levels that are "high", "standard" and "low".

The charging roller 2 having been subjected to the surface treatment under the above conditions was caused to contact the photoreceptor 1 to which the lubricant was applied, and was placed in this state for a long time. As a result, the image defect caused due to the contamination of the photoreceptor was not observed even in the first sheet. Then, the coefficient of dynamic friction between the charging roller 2 and the photoreceptor 1 was 0.25.

However, when the charging roller 2 was incorporated in the modified device and printing was carried out, a black linear image defect was observed significantly. This may be because the slip of the charging roller 2 was significant.

Example 1-2

The firing temperature was set to "high", the firing time was set to "long", and the concentration of the surface treatment liquid was set to "high".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.25.

However, when printing was carried out using this charging roller 2, the black linear image defect was observed slightly. This may be because the slip of the charging roller 2 occurred even though it was slight.

Example 1-3

The firing temperature was set to "high", the firing time was set to "long", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.27. Further, even though printing was carried out using this charging roller 2, the image defect due to the slip of the charging roller 2 was not observed.

Example 1-4

The firing temperature was set to "standard", the firing time was set to "long", and the concentration of the surface treatment liquid was set to "high".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.3. Further, even though printing was carried out using this charging roller 2, the image defect due to the slip of the charging roller 2 was not observed.

Example 1-5

The firing temperature was set to "standard", the firing time was set to "standard", and the concentration of the surface treatment liquid was set to "high".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.31. Further, even though printing was carried out using this charging roller 2, the image defect due to the slip of the charging roller 2 was not observed.

Example 1-6

The firing temperature was set to "high", the firing time was set to "standard", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.33. Further, even though printing was carried out using this charging roller 2, the image defect due to the slip of the charging roller 2 was not observed.

Example 1-7

The firing temperature was set to "standard", the firing time was set to "long", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.35. Further, even though printing was carried out using this charging roller 2, the image defect due to the slip of the charging roller 2 was not observed.

Example 1-8

The firing temperature was set to "standard", the firing time was set to "standard", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.39. Further, even though printing was carried out using this charging roller 2, the image defect due to the slip of the charging roller 2 was not observed.

Example 1-9

The firing temperature was set to "low", the firing time was set to "standard", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was not observed even in the first sheet. Then, the coefficient of dynamic friction between the charging roller 2 and the photoreceptor 1 was 0.4. Further, even though printing was carried out using this charging roller 2, the image defect due to the slip of the charging roller 2 was not observed.

Example 1-10

The firing temperature was set to "standard", the firing time was set to "short", and the concentration of the surface treatment liquid was set to "standard".

The charging roller 2 having been subjected to the surface treatment under the above conditions was caused to contact the photoreceptor 1 to which the lubricant was applied, and was placed in this state for a long time. As a result, the image defect caused due to the contamination of the photoreceptor 1 was not observed even in the first sheet. Then, the coefficient of dynamic friction between the charging roller 2 and the photoreceptor 1 to which the lubricant was not yet applied was 0.42. Further, even though printing was carried out using this charging roller 2, the image defect due to the slip of the charging roller 2 was not observed.

Comparative Example 1-1

The firing temperature was set to "standard", the firing time was set to "short", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was observed in the first sheet, but was not observed in the second and following sheets. Then, the coefficient of dynamic friction between the charging roller 2 and the photoreceptor 1 was 0.42. The reason why the image defect was observed in the first sheet but was not observed in the second and following sheets may be because the photoreceptor 1 was contaminated by the ionic conductive agent, but since the contamination was slight, the ionic conductive agent was scraped by, for example, a cleaning blade. Meanwhile, even though printing was carried out using this charging roller 2, the image defect due to the slip of the charging roller 2 was not observed.

Comparative Example 1-2

The firing temperature was set to "low", the firing time was set to "short", and the concentration of the surface treatment liquid was set to "standard".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was observed in the first to third sheets. Then, the coefficient of dynamic friction between the charging roller 2 and the photoreceptor 1 was 0.45. The reason why the image defect was observed in the first to third sheets may be because the degree of the contamination of the photoreceptor by the ionic conductive agent was significant. Meanwhile, even though printing was carried out using this charging roller 2, the image defect due to the slip of the charging roller 2 was not observed.

Comparative Example 1-3

The firing temperature was set to "low", the firing time was set to "standard", and the concentration of the surface treatment liquid was set to "low".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was observed in the first to third sheets. Then, the coefficient of dynamic friction between the charging roller 2 and the photoreceptor 1 was 0.47. Meanwhile, even though printing was carried out using this charging roller 2, the image defect due to the slip of the charging roller 2 was not observed.

Comparative Example 1-4

The firing temperature was set to "low", the firing time was set to "short", and the concentration of the surface treatment liquid was set to "low".

The charging roller 2 having been subjected to the surface treatment under the above conditions was caused to contact the photoreceptor 1 to which the lubricant was not applied, and was placed in this state for a long time. As a result, the image defect caused due to the contamination of the photoreceptor 1 was observed in the first to third sheets. Then, the coefficient of dynamic friction between the charging roller 2 and the photoreceptor 1 was 0.49. Meanwhile, even though printing was carried out using this charging roller 2, the image defect due to the slip of the charging roller 2 was not observed.

The above results are summarized in Table 1 below.

TABLE 1

| | Firing Temperature | Firing Time | Concentration of Surface Treatment Liquid | Coefficient of Dynamic Friction | Application of Lubricant | Contamination of Photoreceptor | Slip |
|---|---|---|---|---|---|---|---|
| Example 1-1 | High | Long | High | 0.25 | Applied | Good | Bad |
| Example 1-2 | High | Long | High | 0.25 | Not applied | Good | Fair |
| Example 1-3 | High | Long | Standard | 0.27 | Not applied | Good | Good |
| Example 1-4 | Standard | Long | High | 0.3 | Not applied | Good | Good |
| Example 1-5 | Standard | Standard | High | 0.31 | Not applied | Good | Good |
| Example 1-6 | High | Standard | Standard | 0.33 | Not applied | Good | Good |
| Example 1-7 | Standard | Long | Standard | 0.35 | Not applied | Good | Good |
| Example 1-8 | Standard | Standard | Standard | 0.39 | Not applied | Good | Good |
| Example 1-9 | Low | Standard | Standard | 0.4 | Not applied | Good | Good |
| Example 1-10 | Standard | Short | Standard | 0.42 | Applied | Good | Good |
| Comparative Example 1-1 | Standard | Short | Standard | 0.42 | Not applied | Fair | Good |
| Comparative Example 1-2 | Low | Short | Standard | 0.45 | Not applied | Bad | Good |
| Comparative Example 1-3 | Low | Standard | Low | 0.47 | Not Applied | Bad | Good |
| Comparative Example 1-4 | Low | Short | Low | 0.49 | Not applied | Bad | Good |

In the above "Contamination of Photoreceptor" column of Table 1, "Good" indicates that the image defect caused due to the contamination of the photoreceptor 1 was not observed even in the first sheet, "Fair" indicates that the image defect caused due to the contamination of the photoreceptor 1 was observed in the first sheet or in the first and second sheets, but was not observed in the following sheets, and "Bad" indicates that the image defect caused due to the contamination of the photoreceptor 1 was observed in the first to third sheets. Since the ionic conductive agent having adhered to the photoreceptor 1 was scraped by the cleaning blade by the rotation of the photoreceptor 1, the image defect becomes pale as the sheets pass. Thus, "Good" indicates that the photoreceptor is not contaminated, "Fair" indicates that the photoreceptor is slightly contaminated, and "Bad" indicates that the photoreceptor is significantly contaminated.

Similarly, in the above "Slip" column of Table 1, "Good" indicates that the black linear image defect caused due to the slip of the charging roller was not observed, "Fair" indicates that the black linear image defect caused due to the slip of the charging roller occurred slightly, and "Bad" indicates that the black linear image defect caused due to the slip of the charging roller occurred significantly.

It became clear from the present experiment that even if the concentration of the surface treatment liquid used for the surface treatment, and the firing temperature and firing time of the firing treatment are changed variously, it is possible to prevent the ionic conductive agent from leaking out from the rubber layer 22 of the charging roller 2 as long as those treatment conditions are set so that the coefficient of dynamic friction becomes 0.4 or less.

Moreover, it became clear from the results of Example 1-10 and Comparative Example 1-1 that the contamination of the photoreceptor 1 is suppressed if the lubricant is applied to the photoreceptor 1. The reason for this is as follows. That is, even if the ionic conductive agent leaks out from a resistive layer of the charging roller and adheres to the image carrier, it does not strongly adhere to the photoreceptor because of the existence of the lubricant. As a result, since the ionic conductive agent adhered to the image carrier is easily removed by a lubricant applicator, a cleaner and/or the like by the rotation carried out before the image formation, the image defect caused due to the adherence of the ionic conductive agent does not occur.

Meanwhile, it is found that if the coefficient of dynamic friction between the charging roller 2 and the photoreceptor 1 is too small, the black linear image defect may occur. This may be because if the frictional force between the charging roller 2 and the photoreceptor 1 is weak, the charging roller 2 slightly slips on the photoreceptor 1, and uneven charging occurs. Therefore, it is preferable that the coefficient of dynamic friction between the charging roller 2 and the photoreceptor 1 be 0.27 or more.

Further, it became clear from the results of Examples 1-1 and 1-2 that when the charging roller 2 is left as it is under conditions of high temperature and high humidity while contacting the photoreceptor 1 to which the lubricant is applied, the coefficient of dynamic friction of the charging roller 2 becomes small while the charging roller 2 is being left as it is, and the slip easily occurs. Therefore, setting the coefficient of dynamic friction to 0.27 or more is especially important in the image forming apparatus in which the lubricant is applied to the photoreceptor 1.

(Experiment 2)

Next, the present experiment was carried out to examine whether or not, when the charging roller 2 including the rubber layer 22 having been subjected to the surface treatment was caused to contact the photoreceptor 1 under various conditions regarding the surface pressure and was placed in this state for a long time, the photoreceptor 1 is contaminated by the ionic conductive agent leaked out from the rubber layer 22.

The present experiment used the same charging roller 2 and photoreceptor 1 as Experiment 1. The firing temperature, the firing time and the concentration of the surface treatment liquid when carrying out the surface treatment with respect to the rubber layer 22 of the charging roller 2 were set to "standard".

Then, the charging roller 2 and photoreceptor 1 manufactured as above was caused to contact each other so that the surface pressure of the contact portion was a predetermined value described below. Then, they were placed under conditions of room temperature of 35° C. and 80% RH, that is, under conditions of high temperature and high humidity for 14 days. After that, to determine whether or not the surface of the photoreceptor 1 was contaminated by the ionic conductive agent, the photoreceptor 1 was incorporated into a digital multifunction device AR-705S produced by Sharp Corporation, the digital multifunction device AR-705S outputted, as print samples, three A3-size sheets on each of which a half-tone image was formed entirely, and whether or not each sample had image defects (white patch or low-concentration region) due to the contamination of the photoreceptor was confirmed.

Example 2-1

The surface pressure of the contact portion between the charging roller 2 and the photoreceptor 1 was set to 2.8 $g/mm^2$. As a result, the image defect caused due to the contamination of the photoreceptor 1 was not observed even in the first sheet.

Example 2-2

The surface pressure of the contact portion between the charging roller 2 and the photoreceptor 1 was set to 3.5 $g/mm^2$. As a result, the image defect caused due to the contamination of the photoreceptor 1 was not observed even in the first sheet.

Comparative Example 2-1

The surface pressure of the contact portion between the charging roller 2 and the photoreceptor 1 was set to 4.0 $g/mm^2$. As a result, the image defect caused due to the contamination of the photoreceptor 1 was observed in the first sheet, but was not observed in the second and following sheets.

Comparative Example 2-2

The surface pressure of the contact portion between the charging roller 2 and the photoreceptor 1 was set to 4.5 $g/mm^2$. As a result, the image defect caused due to the contamination of the photoreceptor 1 was observed in the first to third sheets.

Comparative Example 2-3

The surface pressure of the contact portion between the charging roller 2 and the photoreceptor 1 was set to 5.0 $g/mm^2$. As a result, the image defect caused due to the contamination of the photoreceptor 1 was observed in the first to third sheets.

The above conditions and results are summarized in Table 2 below.

TABLE 2

| | Surface Pressure ($g/mm^2$) | Contamination of Photoreceptor |
|---|---|---|
| Example 2-1 | 2.8 | Good |
| Example 2-2 | 3.5 | Good |
| Comparative Example 2-1 | 4.0 | Fair |
| Comparative Example 2-2 | 4.5 | Bad |
| Comparative Example 2-3 | 5.0 | Bad |

In Table 2, "Good" indicates that the image defect caused due to the contamination of the photoreceptor 1 was not observed even in the first sheet, "Fair" indicates that the image defect caused due to the contamination of the photoreceptor 1 was observed in the first sheet or in the first and second sheets, but was not observed in the following sheets, and "Bad" indicates that the image defect caused due to the contamination of the photoreceptor 1 was observed in the first to third sheets.

It became clear from the present experiment that when the surface pressure of the contact portion between the charging roller 2 and the photoreceptor 1 was set to 3.5 g/mm$^2$ or less, it is possible to surely prevent the ionic conductive agent from leaking out from the rubber layer 22 of the charging roller 2.

The present invention is not limited to the description of the embodiments and the examples above, but may be altered by a skilled person within the scope of the claims. An embodiment based on a proper combination of technical means disclosed in different embodiments is encompassed in the technical scope of the present invention.

Moreover, needless to say, a numerical range other than the numerical range described in the present specification is included in the present invention as long as it is a rational range which does not go beyond the spirit of the present invention.

As above, a charging roller of the present invention includes a rubber layer obtained by carrying out, using a solvent containing at least an isocyanate compound, a hardening treatment with respect to a conductive agent-added rubber layer so that a coefficient of dynamic friction at a contact portion between the conductive agent-added rubber layer and an image carrier becomes 0.4 or less, the conductive agent-added rubber layer being formed by adding at least an ionic conductive agent to a rubber base material to which a conductive agent is not added. Moreover, each of a process cartridge and image forming apparatus of the present invention includes an image carrier the above charging roller.

Therefore, as described above, even if the charging roller is placed under conditions of high temperature and high humidity for a long time, it is possible to prevent the leakage of the ionic conductive agent.

It is preferable that the rubber layer be obtained by carrying out the hardening treatment with respect to the surface of the conductive agent-added rubber layer so that the coefficient of dynamic friction at the contact portion between the conductive agent-added rubber layer and the image carrier is from 0.27 to 0.4.

As described in Examples, if the coefficient of dynamic friction between the rubber layer and the image carrier is too small, the charging roller may slip on the image carrier. However, according to the above structure, the coefficient of dynamic friction between the rubber layer and the image carrier is 0.27 or more that is sufficiently large, it is possible to prevent the charging roller from slipping on the image carrier when carrying out image formation using the charging roller.

Moreover, it is preferable that the surface pressure of the contact portion between the rubber layer of the charging roller and the image carrier be 3.5 g/mm$^2$ or less.

The surface pressure of the contact portion between the rubber layer of the charging roller and the image carrier is also one factor which influences the leakage of the ionic conductive agent. That is, if the surface pressure of the contact portion is high, the leakage of the ionic conductive agent from the rubber layer tends to occur. Meanwhile, if the surface pressure of the contact portion is low, the leakage of the ionic conductive agent from the rubber layer does not tend to occur.

According to the above structure, the surface pressure of the contact portion is 3.5 g/mm$^2$ or less. Therefore, as described in Examples above, the surface pressure is low enough, and it is possible to surely prevent the leakage of the ionic conductive agent.

It is preferable that the image forming apparatus further include lubricant applying means for contacting the image carrier to apply the lubricant to the image carrier.

According to the above structure, the lubricant applicator applies the lubricant to the image carrier. Therefore, even if the ionic conductive agent leaks out from the rubber layer of the charging roller and adheres to the image carrier, it does not strongly adhere to the image carrier. On this account, the lubricant applicator, the cleaner, and/or the like can remove the ionic conductive agent adhered to the image carrier.

According to the present invention, even if the charging roller including the rubber member whose surface is subjected to the hardening treatment using the solvent containing at least the isocyanate compound is placed under conditions of high temperature and high humidity for a long time, it is possible to prevent the leakage of the ionic conductive agent. Therefore, the present invention is preferably applicable to an electrophotographic image forming apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A method of manufacturing a charging roller, comprising the steps of:

(i) forming a rubber base material, to which an ionic conductive agent is added, on a conductive supporting body of the charging roller as a conductive agent-containing rubber layer; and (ii) carrying out a hardening treatment with respect to a surface of the conductive agent-containing rubber layer by using a surface treatment liquid containing at least an isocyanate compound, wherein:

a correlation between (a) a degree of progress of the hardening treatment and (b) a coefficient of dynamic friction between the surface of the conductive agent-containing rubber layer and a surface of an image carrier contacting the surface of the conductive agent-containing rubber layer is found in advance, and a range of the coefficient of the dynamic friction is set by using the correlation; and in the step (ii), the hardening treatment is carried out until the coefficient of the dynamic friction becomes within the range thus set.

2. The method of manufacturing the charging roller as set forth in claim 1, wherein:

the rubber base material is made from epichlorohydrin rubber, the surface of the image carrier contains a polycarbonate resin and a styryl compound, and the surface treatment liquid contains an acrylic fluorine-based polymer and an acrylic silicone-based polymer; and in the step (ii), the surface treatment liquid is applied to the conductive agent-containing rubber layer so that the conductive agent-containing rubber layer is impregnated with the surface treatment liquid, and then the hardening treatment using heat is carried out until the coefficient of the dynamic friction becomes 0.4 or less.

3. The method of manufacturing the charging roller as set forth in claim 2, wherein:

in the step (ii), the hardening treatment is carried out so that the coefficient of the dynamic friction becomes 0.4 or less but 0.27 or more.

* * * * *